Feb. 1, 1966  H. A:SON MOBERG  3,232,383
ENERGY ABSORBING MEANS
Filed March 25, 1963

Inventor
Harald A: Son Moberg
By
Wenderoth, Lind & Ponack
Attorneys

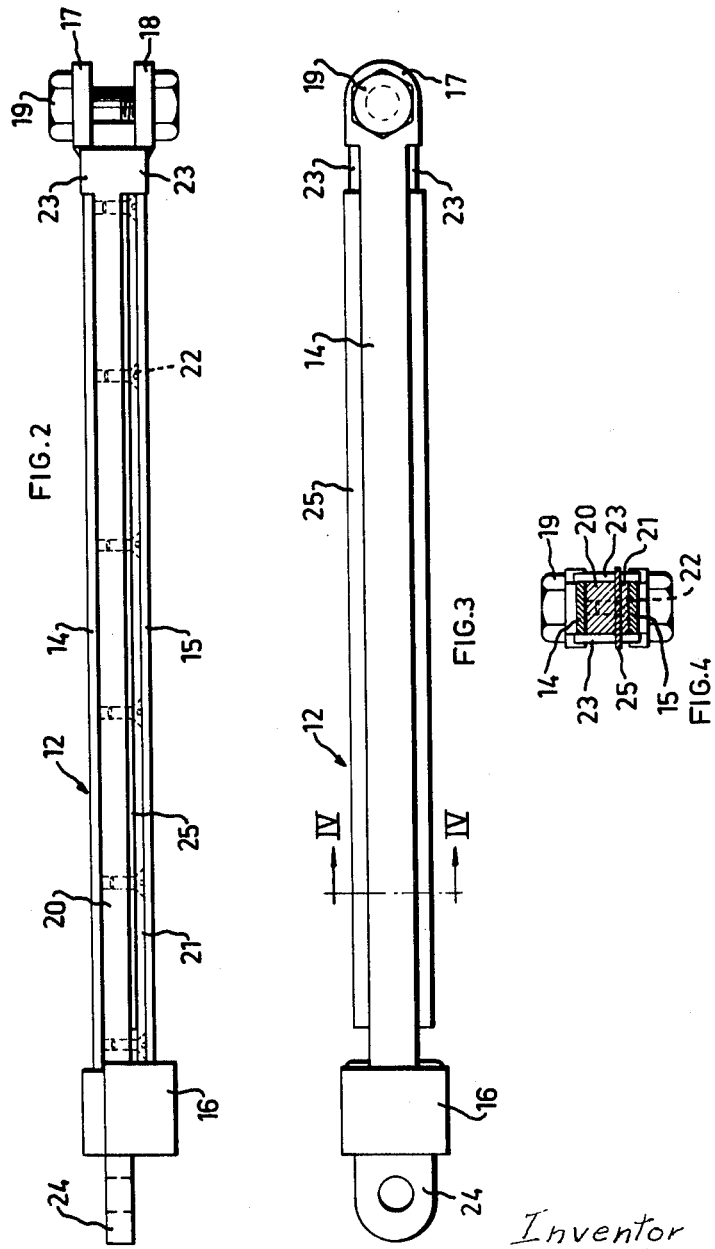

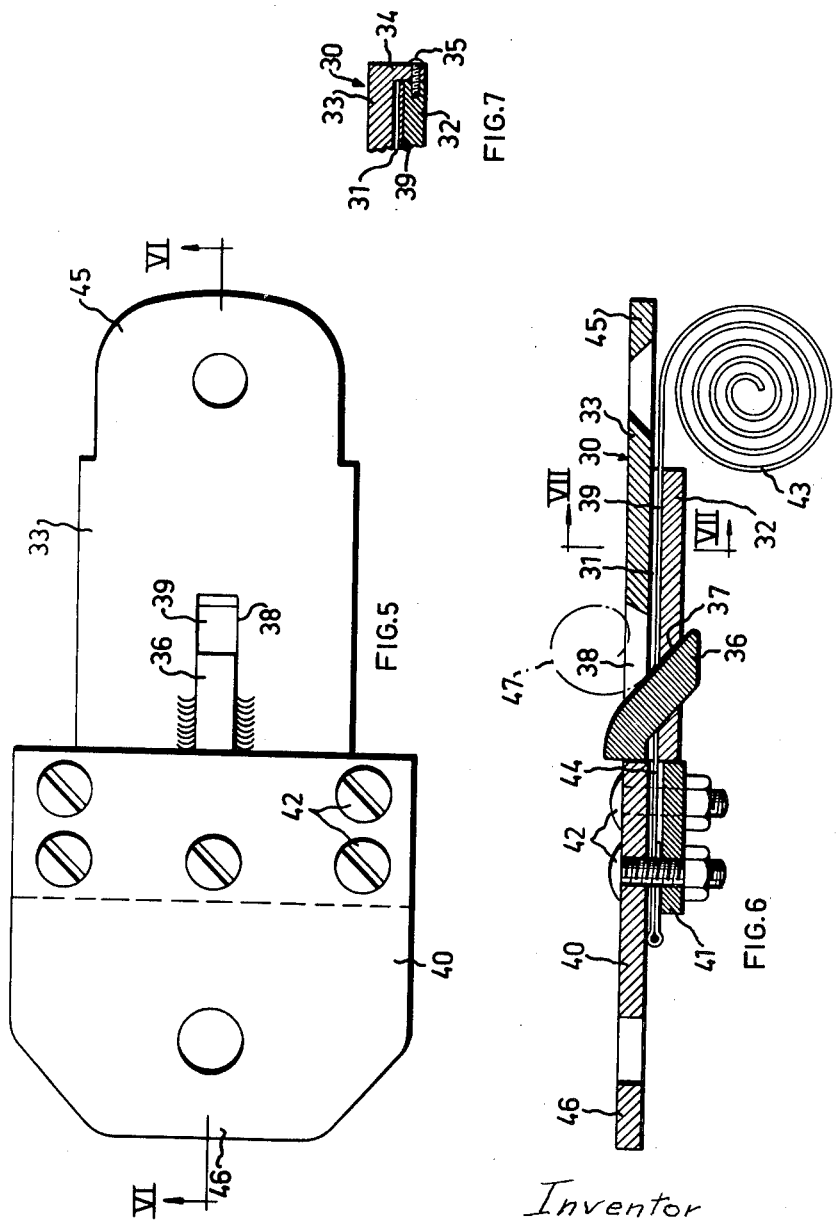

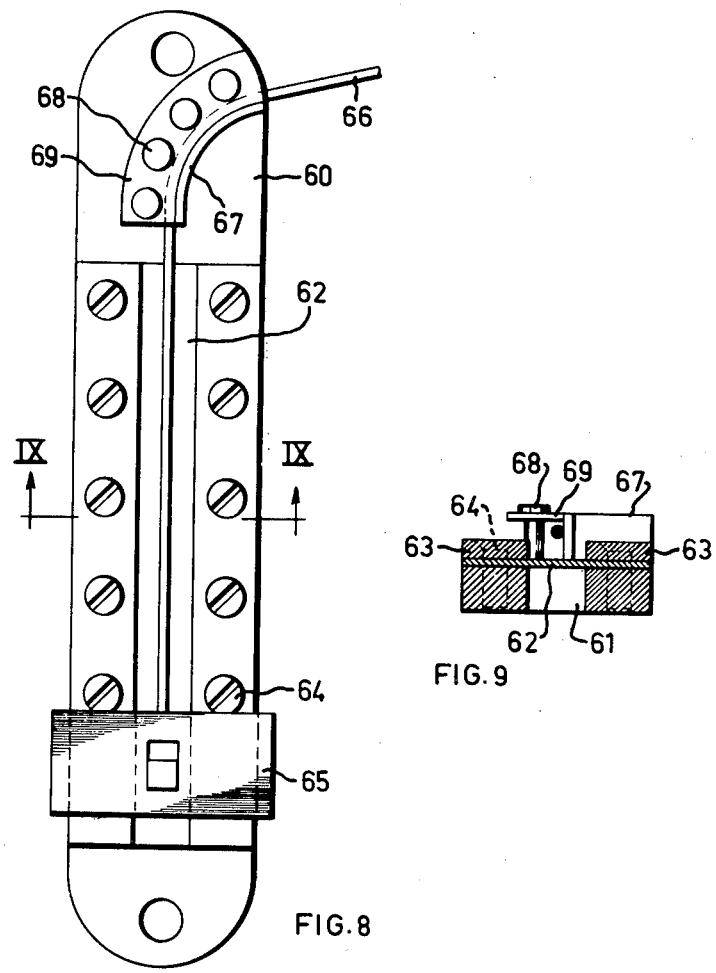

Feb. 1, 1966　　　　H. A:SON MOBERG　　　　3,232,383
ENERGY ABSORBING MEANS
Filed March 25, 1963　　　　　　　　　　　10 Sheets-Sheet 6

Inventor
Harald A:Son Moberg
By
Wenderoth, Lind & Ponack
Attorneys

Feb. 1, 1966  H. A:SON MOBERG  3,232,383
ENERGY ABSORBING MEANS

Filed March 25, 1963  10 Sheets-Sheet 7

Inventor
Harald A:Son Moberg
By
Wenderoth, Lind & Ponack
Attorneys

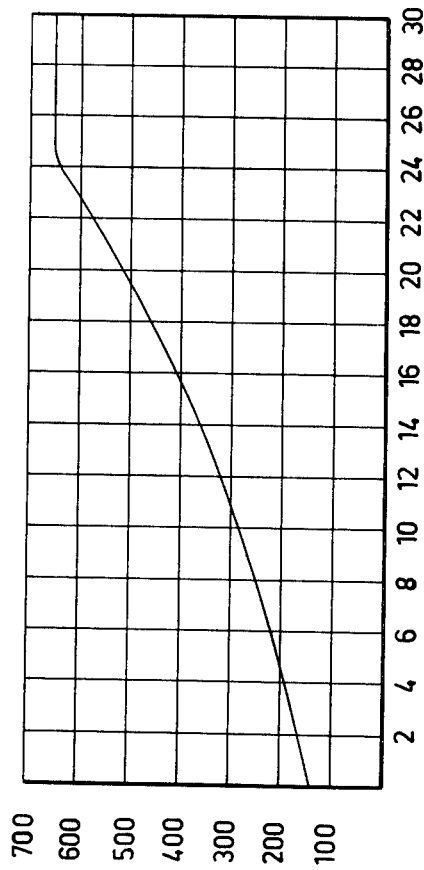

Feb. 1, 1966    H. A:SON MOBERG    3,232,383
ENERGY ABSORBING MEANS
Filed March 25, 1963    10 Sheets-Sheet 9
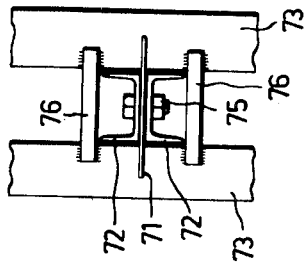
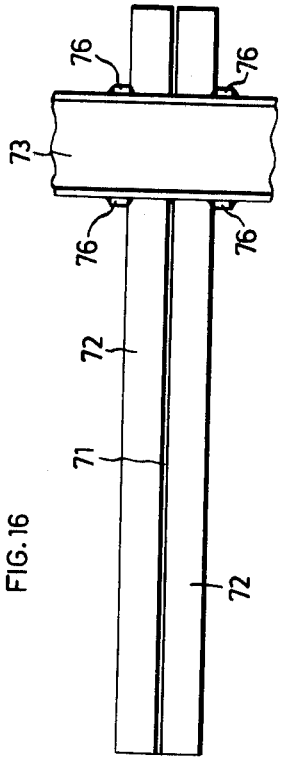
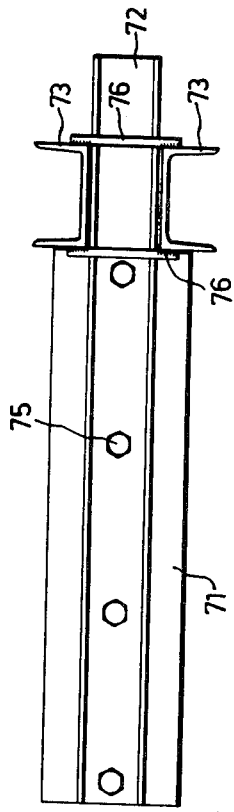
Inventor
Harald A: Son Moberg
By
Wenderoth, Lind & Ponack
Attorneys

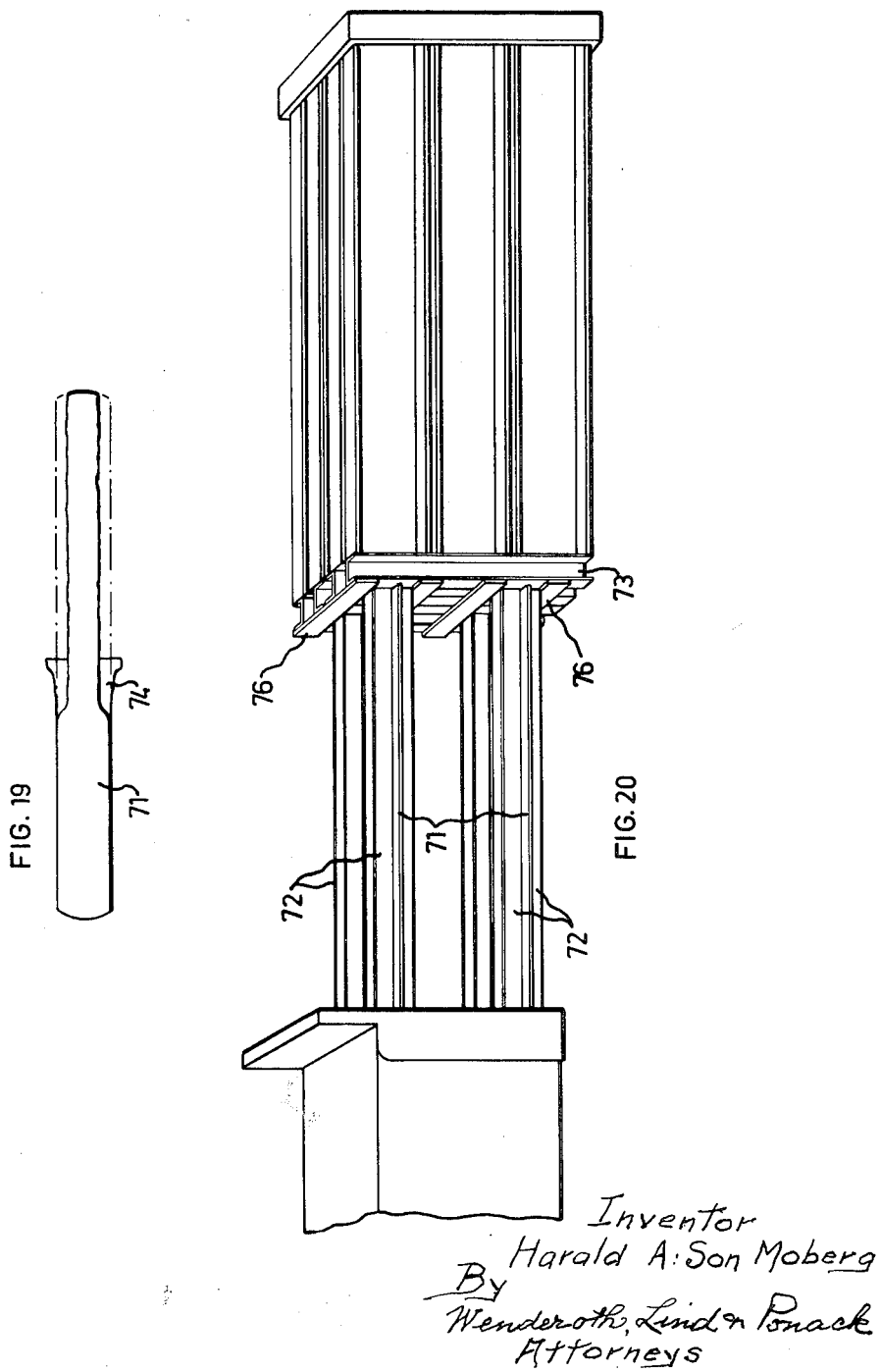

United States Patent Office 3,232,383
Patented Feb. 1, 1966

3,232,383
ENERGY ABSORBING MEANS
Harald A:son Moberg, Sveavagen 25, Uppsala, Sweden
Filed Mar. 25, 1963, Ser. No. 267,520
Claims priority, application Sweden, Mar. 26, 1962,
3,338/62
3 Claims. (Cl. 188—1)

This invention relates to an apparatus for absorption of energy from a moving load comprising two elements which are relatively movable by the movement of the load, said relative movement taking place against the action of shearing and plastic deformation of a material.

To make possible that the energy absorption in such an apparatus be adapted to varying circumstances and requirements and to make the apparatus easily operative again once it has been in operation it is suggested according to the present invention to provide the material to be shorn and plastically deformed as a metal sheet on one element and to arrange the other element as a means displaceable along said metal sheet for continuous shearing-off of at least one strip from the metal sheet throughout said metal sheet and for continuous plastic deformation of the shorn-off metal strip at a relative movement between the two elements. Sheet metal is a comparatively cheap material which is easily exchanged and which by lamination or otherwise is easily given varying thicknesses along the shearing path to attain the characteristic curve, desired in each particular case, for the energy absorption in relation to the distance the load moves.

The apparatus according to the invention can be employed to absorb energy of motion of any load whatever to damp a shock, pressure or pull. The following uses of the apparatus may be mentioned by way of example: protection against load displacement in trucks and other vehicles; braking means in connection with devices for catching aircraft and other vehicles, e.g. arresting gears for the landing strips of airports and aircraft carriers; shock absorbers in safety netting for catching human beings and loads; bumpers for vehicles and bumping stops; fender devices protecting against extremely heavy collisions in ferry landing stages and the like; simple and directly useful mechanical aids in measuring the energy of shocks etc.; and safety devices in motor cars for protecting the seat occupants against collision injuries. In the last-mentioned case the apparatus can be employed as an energy absorber between a seat displaceable longitudinally of the vehicle and the vehicle body to provide, in the event of a collision, a gentle braking of the person who occupies the seat by retaining him in his seat with the aid of a suitable belt or harness anchored in the seat and who at a violent braking of the vehicle is moved forward with his seat when said seat as a result of the braking is displaced relative to the vehicle body under simultaneous arresting of its relative movement by means of the energy absorbing apparatus. However, the apparatus according to the invention may also be included in safety seat belts for motor cars, which are anchored in a known manner in the car body. In such connection the apparatus will find extremely wide application, and in developing the invention particular attention has therefore been paid to this use.

Already at an early stage of the development of safety seat belts for motor cars it was considered that a safety seat belt should not be entirely rigid but should be able gently to arrest the movement of the seat occupant relative to the vehicle at a violent braking of the vehicle movement as a result of an abrupt application of the vehicle brakes or as a result of a collision in order that the person strapped in his seat should be exposed to a less abrupt braking and thereby be protected from ensuing physical injuries. However, one relatively soon realized the great difficulties one faced in satisfying this requirement without simultaneously introducing the considerable risk of the so-called slingshot effect, implying that the person strapped in his seat, after his body has been arrested by means of the safety seat belt, by reason of an elastic stretching thereof during braking is suddenly pulled back against the vehicle seat when the safety seat belt springs back with the subsequent risk that the aorta is torn, the neck is broken or other serious injuries result. That meant to provide increased safety by means of the safety seat belt may thus turn into a threat against the safety.

During the intense research and developing activities of the last five years to increase the safety in motoring, particular attention being paid to safety seat belts, one has tried to provide a safety seat belt which is designed to yield substantially purely plastically under load, but despite exhaustive work one has not yet succeeded in realizing such a safety seat belt of ideal conception. One would have expected that the goal could have been reached by employing, in the safety seat belt, straps of such a nature that they can be subject to plastic stretching only, but hitherto one has not succeeded in finding any combination of material and type of weave that satisfactorily combines this plastic stretchability with high tensile strength and great flexibility: two properties quite indispensable to a practically useful safety seat belt. One has therefore tried to obtain the desired result by instead connecting at some point of the safety seat belt an element which takes care of the plastic stretchability of the safety seat belt. Suggestions made in this connection have as a rule been based on the frictional effect between two relatively movable parts or on the braking effect of a liquid expelled through a throttled opening. Such devices may function satisfactorily in a newly installed and well-adjusted state but when utilized in a vehicle they may be subject to aging phenomena and above all to corrosion—in the case of hydraulic devices also to leakage—so that one can never be sure that the devices actually function in the contemplated manner if—after being installed in a vehicle for many years—they shall suddenly become operative to fulfil their important task.

The problem of obtaining plastic yieldingness of a safety seat belt in a motor car, which is anchored in the car body, with the exclusion of the risk of the slingshot effect, is ideally solved in that the apparatus according to the invention is connected by means of either of the elements with a strap of the safety seat belt while the other element is connected with the car body for anchoring said strap in the car body with the intermediary of the two elements which are relatively movable against the action of continuous shearing and plastic deformation of the sheet metal material.

For elucidation of the invention some embodiments thereof, which have been developed for testing purposes, as well as the considerations and test results on which the the invention is based, will be described more in detail in the following, reference being had to the accompanying drawings, in which:

FIG. 2 is a side elevational view of an embodiment of the shearing apparatus;

FIG. 3 is a plan view of the shearing apparatus in FIG. 2;

FIG. 4 is a section on line IV—IV in FIG. 3;

FIG. 5 is a plan view of a second embodiment of the shearing apparatus;

FIG. 6 is a section on line VI—VI in FIG. 5 of the embodiment in FIG. 5;

FIG. 7 is a section of a detail on line VII—VII in FIG. 6;

FIG. 8 is a plan view of still another embodiment of the shearing apparatus;

FIG. 9 is a section on line IX—IX in FIG. 8;

FIG. 15 is a diagram showing the shear force in relation to the shearing distance for a metal sheet of the embodiment shown in FIGS. 10 and 11;

FIG. 16 is a side elevational view of a shearing apparatus according to the invention, which is to serve as safety means for protection against shocks upon load displacement in trucks or like vehicles;

FIG. 17 is an end view of the apparatus in FIG. 16;

FIG. 18 is a plan view of the apparatus in FIG. 16;

FIG. 19 is a plan view of a removed metal sheet after shearing;

FIG. 20 is a perspective view of a set of four shearing apparatuses according to FIGS. 16–18, connected in parallel.

Figure 1:
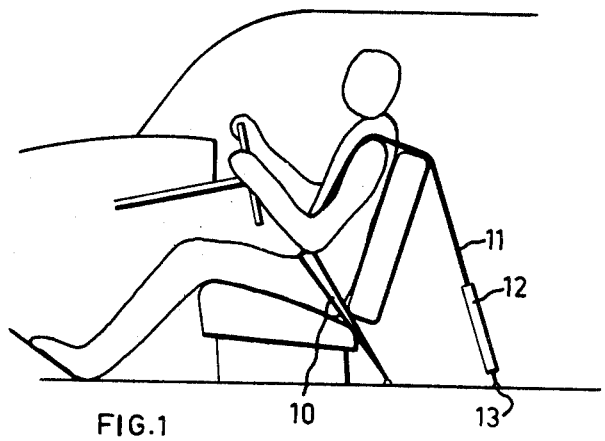
FIG. 1 is a view of a safety seat belt having a shearing apparatus according to the invention.

FIG. 1 of the drawings shows a safety seat belt including a hip strap 10 anchored in the floor structure of the motor car on either side of the seat, and a chest strap 11 extending from said hip strap over one shoulder of the strapped person and connected with a shearing apparatus 12 by means of which the chest strap 11 is anchored in the floor structure of the motor car behind the seat at a fixation point 13.

FIGS. 2–4 show an experimental design of the shearing apparatus 12. In this design the shearing apparatus includes a pair of rails 14 and 15 which is interconnected at one end in spaced-apart relationship by means of a guide block 16 and is formed at the other end with a lug 17 and 18, respectively. Through said lugs passes a bolt 19 for securing the shearing apparatus for example to the fixation point 13 in FIG. 1. Disposed between the rails 14 and 15 is a further pair of rails, a thick rail 20 and a thin rail 21 which are interconnected by countersunk screws 22 and are longitudinally displaceable in the space between the rails 14, 15 and through an opening in the guide block 16, the rail 20 being at one end formed with flanges 23 guiding it along the side edges of the rails 14, 15, and at the other end with a lug 24 projecting beyond the guide block 16 when the rails 20, 21 are pushed in entirely between the rails 14 and 15, as shown in FIGS. 2 and 3. The lug 24 is intended for fixation of for example the chest strap 11 (FIG. 1) to the shearing apparatus. With the shearing apparatus connected between the chest strap 11 and the fixation point 13 the element formed by rails 20 and 21 is thus displaceable longitudinally of the element formed by the rails 14, 15 in that a pull is exerted at the chest strap 11. To counteract such displacement by shearing and plastic deformation there is secured between the rails 20, 21 a metal sheet 25 which is broader than said rails 20, 21 and also broader than the opening for said rails in the guide block 16 so that when the rails 20, 21 are pulled through the guide block out of the space between the rails 14, 15 the metal sheet 25 will come to bear against the guide block 16, and if sufficient force is exerted between the two relatively movably elements, two metal strips will be shorn off on either side of rails 20, 21 simultaneously as these strips will be compressed or folded against the guide block 16. When the shearing apparatus 12 is connected between the chest strap 11 and the fixation point 13, as shown in FIG. 1, the apparatus in the event of a collision or other violent braking serves the purpose of permitting an elongation of the chest strap 11 so that the strapped person is gently braked in relation to the vehicle which stops more or less abruptly. The elongation of the chest strap 11 is thereby effected against a great resistance corresponding to the work required for shearing off and plastically deforming the marginal strips of the metal sheet 25.

Figure 12:
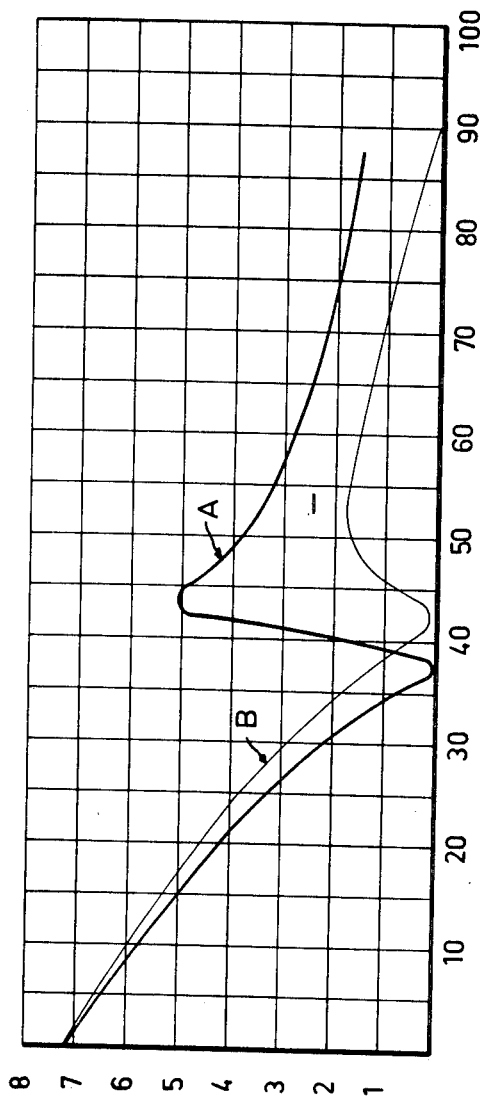
FIG. 12 is a diagram showing the absolute speed of the strapped person on a time base.
Figure 13:
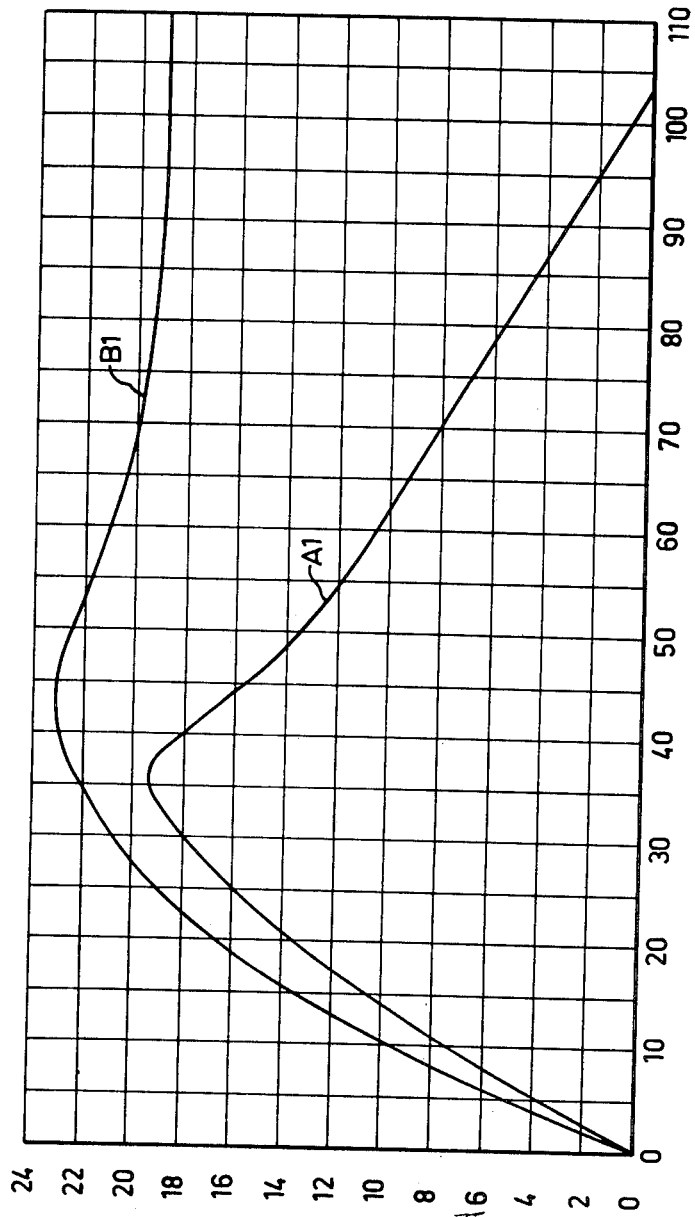
FIG. 13 is a diagram showing the distance the strapped person moves relative to the motor car on a time base.

Comparative experiments have been made to establish the relations in a conventional safety seat belt of fabric and a non-stretchable safety seat belt (of steel wire) equipped with a shearing apparatus according to FIGS. 2–4, and the results of these comparative experiments are shown in FIGS. 12 and 13. In the experiments use was made of a dummy which was strapped to a test vehicle merely by means of a hip strap. The test vehicle was accelerated and caused to stop abruptly by impact against an obstacle. Curve A in FIG. 12 indicates the absolute speed of the strapped dummy (the ordinate) on a time base (the abscissa) when the safety seat belt consisted of an ordinary fabric belt. As will be seen, the strapped dummy approximately 38 milliseconds after the collision moment which is represented by the ordinate in FIG. 12 and in which the strapped dummy had an absolute speed of about 7 meters per second, reached the speed of zero but that, as a result of the spring-back of the safety seat belt, at the short time of about 6 milliseconds a speed of 5 meters per second in the opposite direction was imparted to the dummy (in the diagram in FIG. 12 the negative speed also has been plotted on the positive side of the abscissa). This important acceleration of the strapped dummy by reason of the spring-back to the safety seat belt implies a dangerous threat to the strapped dummy. Curve B in FIG. 12 indicates the absolute speed of the strapped dummy with the use of a hip-embracing non-stretchable belt (steel wire belt) in combination with the shearing apparatus but otherwise under identical conditions. The strapped dummy was now braked somewhat more slowly in that the speed of zero was reached about 5 milliseconds later than with the use of a fabric belt, viz. about 43 milliseconds after the collision moment. However, particular attention should here be paid to the fact that the braking to zero speed is not followed by any abrupt acceleration of the type illustrated by curve A but only by an insignificant increase of speed in the opposite direction to 1.8 meters per second for a time of about 10 milliseconds. This spring-back which will have its cause in a certain resilience of the testing equipment, is not dangerous to strapped persons.

FIG. 13 shows the distance the strapped dummy moves relative to the vehicle (the ordinate) on a time base (the abscissa), curve A1 relating to the experiment using an ordinary fabric belt and curve B1 relating to the experiment using a non-stretchable belt (steel wire belt) and shearing apparatus. It will be evident that according to curve A1 the strapped dummy was thrown forwards from the seat but then jerked back again against the seat, while according to curve B1 the strapped dummy was practically not jerked back after the forward movement immediately after the collision moment because the forward movement took place under a practically purely plastic yielding of the safety belt. The curves in FIGS. 12 and 13 strikingly illustrate the effect obtained by the apparatus according to the invention.

Figure 14:
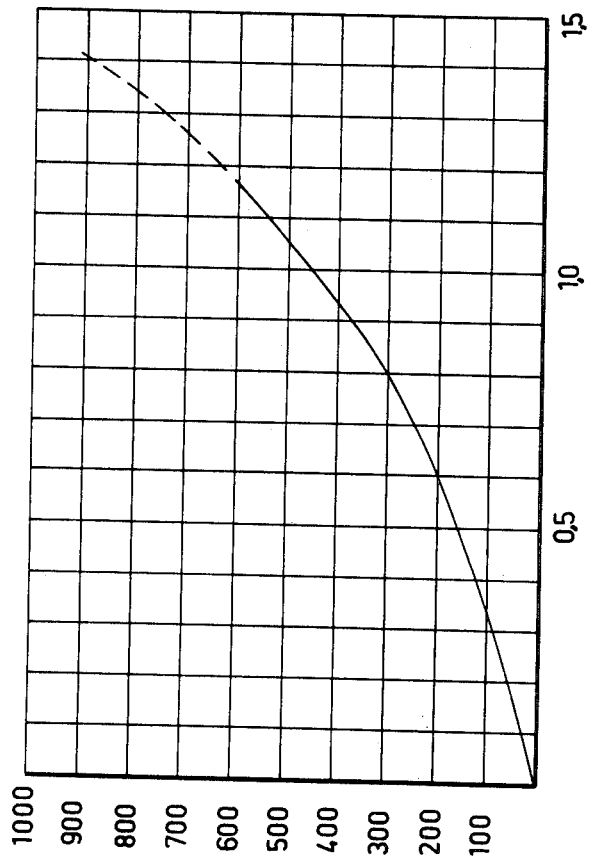
FIG. 14 is a diagram showing how the shear force depends on the thickness of the shorn metal sheet.

The force required for shearing off and plastically deforming the sheet metal strips will be dependent on the nature of the shorn-off material, the thickness of the metal sheet and the width of the shorn-off metal strips. FIG. 14 illustrates the dependence of the force on the sheet metal thickness with the use of black plate in the apparatus according to FIGS. 2–4 and at a total width of the shorn-off and plastically deformed strips of 11 mm.

It may be difficult to mount the shearing apparatus of FIGS. 2–4 in a suitable manner in a vehicle if the fixation point 13 is not located on the floor structure of the car body but on the wall of the car body at shoulder level behind the seat, as is the case in the generally employed safety seat belts of the type "Vattenfall" (the safety seat belt developed by Kungl. Vattenfallsstyrelsen=The State Power Board of Sweden) and the so-called three-point seat belts. An experimental design better suited for mounting in such safety seat belts is shown in FIGS. 5–7. The shearing apparatus therein shown includes a slide 30 having a channel 31 defined between a plate 32 and a plate 33, the latter plate being secured with its marginal flanges 34 by screws 35 to the side edges of the plate 32. A tongue 36 firmly welded to the plate 33 extends through the channel 31 into an opening 37 in the plate 32, and above said tongue the plate 33 has an opening 38 of at least the same width as that of the tongue 36. A sheet metal band 39 extends through the channel 31 and has one end firmly secured between two plates 40 and 41 which are secured together by screws 42. Adjacent the other end the sheet metal band 39 is coiled into a helix 43. The end of the sheet metal band secured between the plates 41 and 42 presents a slot 44 through which the tongue 36 extends. The slide 30 has a lug 45, which is formed by the plate 33, to permit connection thereof for instance with the safety seat belt, and the element formed by the secured-together plates 40 and 41 has a lug 46, which is formed by the plate 40, to permit connection thereof for example with the fixation point in the car body.

When the shearing apparatus according to FIGS. 5–7 is disposed in this manner in a safety seat belt and a load is applied to this belt the slide 30 and the element 41, 42 will be pulled apart provided that the force is sufficiently large, the slide 30 being moved along the sheet metal band 39 under successive straightening of the helix 43 and shearing-off of a strip from the sheet metal band by means of the tongue 36. The width of this strip corresponds to that of the tongue 36 and the strip is urged by the tongue 36 out of the slide 30 through the opening 38 therein under plastic deformation, coiling itself above the tongue 36, as indicated by a dash and dot line 47.

As will be evident the shearing apparatus in this embodiment is less bulky than in the elongated design shown in FIGS. 2–4, and to arrange one or more such shearing apparatuses in a safety seat belt of any kind whatever will not imply any difficulties.

Figure 11:
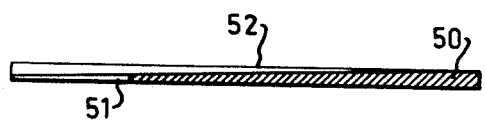
FIG. 11 is a longitudinal sectional view of the metal sheet in FIG. 10.
Figure 10:
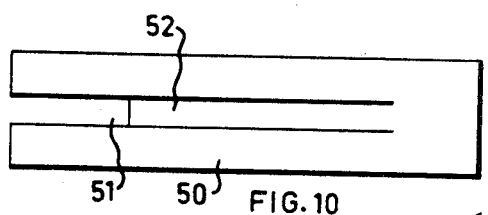
FIG. 10 is a plan view of a metal sheet for the shearing apparatus according to FIGS. 5–7.

The shearing apparatuses described offer the possibility of making the resistance realized by the shearing apparatus dependent on the shearing distance, and FIGS. 10 and 11 show a sheet metal band for use in the shearing apparatus according to FIGS. 5–7, in which this possibility has been exploited. The sheet metal band in FIGS. 10 and 11 is generally designated 50 and presents the slot referred to in connection with FIGS. 5–7 and here designated 51. Starting from the inner end of said slot is a central groove 52 which runs longitudinally of the sheet metal band and is of a width corresponding to that of the tongue 36. Said groove is of a depth successively decreasing from a highest value at the inner end of the slot 51 so that the groove finally disappears. The shear and deformation force is dependent int. al. on the sheet metal thickness as has been shown in FIG. 14, and therefore an ever increasing force is required to shear off and plastically deform the strip of the sheet metal band 50 formed by the bottom of the groove 52. This is illustrated in FIG. 15 which shows the relation of the force to the shearing distance with the use of black plate in which there has been provided a groove of successively decreasing depth so that the sheet metal thickness in the groove varies from 0.3 mm. to 1.25 mm. over a length of 24 cm. Over this length the shear force required rises from 150 kp. to 650 kp. Any desired course whatever of the curve in FIG. 14 can be obtained by variation of the sheet metal thickness. With the apparatus according to FIGS. 2–4 the same effect can be obtained in that the projecting marginal portions of the metal sheet 25 or this sheet in its entirety are given varying thicknesses.

The shearing apparatus must not necessarily be directly connected with the safety seat belt. It is very well conceivable to dispose or mount the shearing apparatus wherever that is considered most suitable and to connect it with the safety seat belt by means of a steel wire which is easily passed over guides between different points in the vehicle. FIGS. 8 and 9 show an embodiment of the shearing apparatus intended for such mounting. This embodiment in its way is a combination of the two earlier described embodiments and includes an elongated plate 60 which is to be secured in the car body and which has a longitudinal central slot 61. Said slot is covered by a metal sheet 62 which is clamped to the plate 60 between the latter and a pair of rails 63 secured to the plate 60 by countersunk screws 64. On the element formed by plate 60, metal sheet 62 and rails 63 there is guided for longitudinal movement a slide 65 of similar design as the slide 30 according to FIGS. 5–7 inasmuch as the slide in a manner not shown in detail has a tongue for shearing-off a strip from the metal sheet 62 in the slot 61. Said slide 65 is connected with the safety seat belt (not shown) by a steel wire 66. At the upper end of plate 60 the wire 66 is guided in a passage between a metal sheet 67 upstanding at right angles from plate 60, headed pins 68 fixed to said plate, and a metal sheet 69 bridging the distance between metal sheet 67 and pins 68.

According to the invention, one or more shearing apparatuses may be disposed at various points in safety seat belts of different types.

The apparatus according to FIGS. 16–18 includes a shearing metal sheet 71 clamped between two relatively rigid U-beams 72 which are screwed together with facing webs by means of bolts 75. The metal sheet 71 has a larger transverse dimension than the beams 72. The beams are inserted in an abutment formed by two U-beams 73 which are secured together by welded cross members 76 of bar stock and spaced apart to form an opening receiving the beams 72 and having a relatively sharp edge. The opening is so dimensioned that the beams 72 fit thereinto with a relatively small tolerance, whereas the metal sheet 71 does not fit into the opening.

If a pressure force tends to move the beams 72 through the opening of the abutment, the metal sheet 71 will prevent said movement until the force has reached the value necessary for shearing, the projecting edges of the metal sheet being thereby shorn off and the shorn-off metal strips plastically deformed against the beams 73. The energy absorbed corresponds to the product of the pressure force and the distance moved.

FIG. 19 shows a shearing metal sheet 71 which has been removed from a shearing apparatus after it had absorbed energy. As will be seen in this figure the metal sheet has been shorn off over a certain part of its length when the abutment formed by the beams 73 was subjected to a shock or the like. The shorn-off portion 74 is a measure of the energy absorbed.

The size of the pressure force is determined by the sheet metal thickness, the sheet metal material, and the number of shearing paths. It is relatively constant during the entire movement. If there exist high requirements for said pressure force to be uniform several apparatuses according to FIGS. 15–18 should be assembled to a set of apparatuses so that several shearing paths are obtained. An assembled set of four such apparatuses is shown in FIG. 20. The abutment formed by the beams 73 has an opening for each pair of beams 72.

If a metal sheet of increasing or decreasing thickness is inserted one obtains a pressure force successively increasing or decreasing with the distance moved. The same effect, although stepwise, is obtained with packs of assembled metal sheets of different lengths.

The apparatus is of the same usefulness for push as well as pull. The beams 72 and the shearing metal sheet 73 can be given a length which is suitable for the desired values of energy absorption. For pull, several beams 72 can be connected together in series, should a large length be desired.

The embodiments of the invention described and shown in the foregoing are many in number but nowise exhaustive. As a further example it may be mentioned that one of the relatively movable elements may be in the shape of an arm radially projecting from a rotatable shaft and having a transverse tongue which is movable by rotation of the shaft in a circular movement along a circular or annular metal sheet carried by the other element to shear off a circularly bent strip from said metal sheet and to plastically deform said strip.

What I claim and desire to secure by Letters Patent is:

1. An apparatus for absorption of energy from a moving load comprising a metal sheet, a first element supporting said metal sheet and including two substantially rigid rails clamping the metal sheet between them with at least one elongated marginal portion of the metal sheet freely projecting therefrom, and a second element forming an opening permitting the rails to pass therethrough, said first and second elements being relatively movable longitudinally of said metal sheet by the movement of the load, said second element being adapted to be set against said elongated marginal portion of the metal sheet at one end thereof with a wall portion surrounding said opening for continuous shearing-off of said elongated portion of the metal sheet throughout said portion and for continuous plastic deformation of said portion at relative movement of said first and second elements.

2. An apparatus for absorption of energy from a moving load comprising a metal sheet, a first element supporting said metal sheet and including two substantially rigid members clamping the metal sheet between them with at least one elongated marginal portion of the metal sheet freely projecting therefrom and a second element forming a passage for said first element therethrough, said first and second elements being relatively movable longitudinally of said metal sheet by the movement of the load, said second element being adapted to be set against said elongated marginal portion of the metal sheet at one end thereof for continuous shearing-off of said elongated portion of the metal sheet throughout said portion and for continuous plastic deformation of said portion at relative movement of said first and second elements.

3. An apparatus for absorption of energy from a moving load comprising a metal sheet, a first element supporting said metal sheet and including two substantially rigid rails releasably secured together clamping the metal sheet between them with two elongated marginal portions of the metal sheet freely projecting therefrom on opposite sides of the rails, and a second element forming an opening receiving said rails and permitting the rails to pass therethrough, said first and second elements being relatively movable longitudinally of said metal sheet by the movement of the load, said second element being adapted to be set against said elongated marginal portions of the metal sheet at one end thereof with a wall portion surrounding said opening for continuous shearing-off of said elongated marginal portions of the metal sheet throughout said portion and for continuous plastic deformation of said portion at relative movement of said first and second elements.

References Cited by the Examiner

UNITED STATES PATENTS

| | | | |
|---|---|---|---|
| 2,705,586 | 4/1955 | Young | 297—389 X |
| 2,771,128 | 11/1956 | Doolittle | 297—386 |
| 2,953,189 | 9/1960 | Barash | 188—1 X |
| 3,026,972 | 3/1962 | Hendry et al. | 188—1 |
| 3,089,564 | 5/1963 | Smittle. | |
| 3,096,268 | 7/1963 | Lindsay et al. | 188—1 |
| 3,106,989 | 10/1963 | Fuchs | 188—1 |

FOREIGN PATENTS 1,105,404  7/1955  France.

MILTON BUCHLER, *Primary Examiner.*

FRANK B. SHERRY, EUGENE G. BOTZ, *Examiners.*